United States Patent [19]

Lambertus

[11] 4,395,212
[45] Jul. 26, 1983

[54] SCREEN-CHANGE DEVICE FOR EXTRUDERS

[75] Inventor: Friedrich Lambertus, Stuttgart, Fed. Rep. of Germany

[73] Assignee: Werner & Pfleiderer, Stuttgart, Fed. Rep. of Germany

[21] Appl. No.: 248,329

[22] Filed: Mar. 27, 1981

[30] Foreign Application Priority Data

Apr. 3, 1980 [DE] Fed. Rep. of Germany ....... 3013038

[51] Int. Cl.³ ........................ B01B 25/12; B29F 3/02
[52] U.S. Cl. .................................. 425/185; 210/236; 210/DIG. 15; 264/169; 425/186; 425/198; 425/199; 425/378 R; 425/382 R
[58] Field of Search ................ 425/199, 197–198, 425/183, 186, 185, 378 R, 382 R; 210/791, 236, DIG. 15; 264/169

[56] References Cited

U.S. PATENT DOCUMENTS

| 2,786,504 | 3/1957 | Samler | 425/198 |
| 3,007,199 | 11/1961 | Curtis | 425/198 |
| 3,461,495 | 8/1969 | Swickard et al. | 425/378 R |
| 3,856,680 | 12/1974 | Elmore | 210/236 |
| 4,021,346 | 5/1977 | Berthiaume | 210/236 |
| 4,059,525 | 11/1977 | Krasnow | 210/236 |
| 4,167,384 | 9/1979 | Shirato et al. | 425/199 |
| 4,184,832 | 1/1980 | Cuff | 425/382 R |
| 4,268,391 | 5/1981 | Paquette | 210/236 |
| 4,277,338 | 7/1981 | Hoagland | 425/199 |

FOREIGN PATENT DOCUMENTS

| 1800169 | 4/1970 | Fed. Rep. of Germany | 425/185 |
| 1554913 | 1/1971 | Fed. Rep. of Germany | 425/183 |
| 2811771 | 3/1978 | Fed. Rep. of Germany | 425/199 |
| 630088 | 10/1978 | U.S.S.R. | 425/199 |

Primary Examiner—Jeffery R. Thurlow
Attorney, Agent, or Firm—Hane, Roberts, Spiecens & Cohen

[57] ABSTRACT

A screening apparatus for molten plastic material flowing from an extruder comprising a housing mounted on the extruder and having a feed channel for flow of the plastic material therefrom and a slide member mounted for slidable movement in the housing with a clearance therebetween. The slide member contains replaceable screen elements adapted for being positioned in the path of flow of the plastic material flowing from the extruder to effect screening thereof. In order to seal the clearance between the slide member and the housing to prevent outflow of plastic material therefrom, a flange is mounted on the housing to surround the slide member with a gap therebetween. This permits normal free-sliding movement of the slide member in the housing. The flange contains cooling channels to permit flow of a coolant to cool plastic material in the gap and solidify the plastic material to prevent outflow of plastic material from the gap. The flange is mounted on the housing by thermal insulation which prevents cooling of the housing upon cooling of the flange.

9 Claims, 4 Drawing Figures

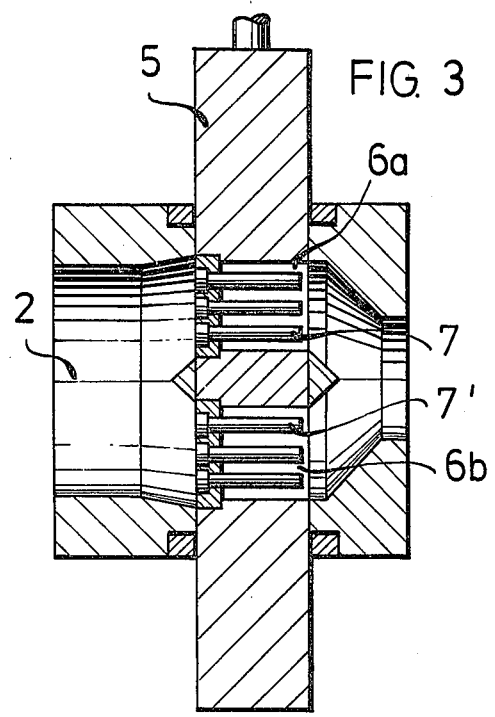
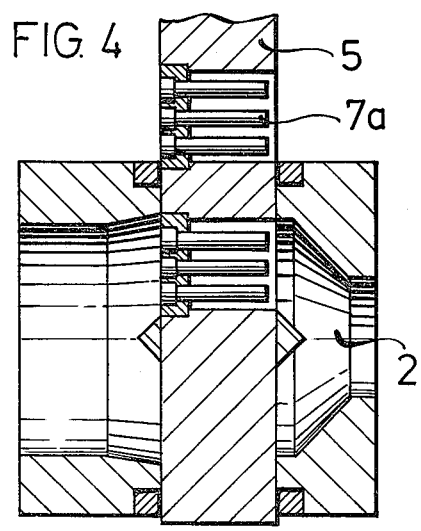

SCREEN-CHANGE DEVICE FOR EXTRUDERS

BACKGROUND OF THE INVENTION

The present invention relates to a screen-change device and, more particularly, to such devices for extruders which continuously treat molten plastics.

Such screen-change devices serve the purpose of removing impurities by replaceable screen elements, from the molten mass prepared in the extruder before it is processed further. The replacement of the screen elements is effected during the continuous preparation process whenever the resistance to flow of the molten mass increases to an impermissible extent as a result of the clogging of the screen elements.

In view of the increasing demands made on the purity of raw plastics, increasingly finer filter meshes are used, which require more frequent replacement of the filters. Accordingly, larger amounts of molten plastic adhering to the change slide and in the region of the screen elements come into contact with the open air and are cracked under contact with oxygen, thereby impairing the quality of the final product. In order to remedy this problem, it has been proposed to provide separate change slides, each equipped with only one screen borehole, which slides are inserted in parallel flow channels. See, for example, West German Unexamined Patent application 28 11 771.

By using a plurality of change slides, the number of leakage points formed by the openings in the housing for each change slide is correspondingly increased.

The openings in the housings are furthermore blocked by sealing rings whose development favors the attachment of melt residues, whereby burned product passes into the filter chambers upon replacement of the filter.

In another known filter device, cooling channels are provided in the changer housing for the sealing off of the change slide (West German Provisional patent 1 554 913).

The cooling action obtained by this measure is, however, slight and furthermore cannot be controlled from the outside since the heat fed to the changer housing does not permit a suitable sealing of the sliding clearance between change slide and changer housing.

Furthermore, in this filter arrangement the screen chambers are utilized by the screen insert only over a part of their length, so that larger amounts of melt residues which adhere to the change slide are also removed.

BRIEF SUMMARY OF THE INVENTION

An object of the present invention is to remedy these disadvantages and to provide a structurally simple screen-change device which permits dependable sealing of the change slide in continuous operation even with large throughputs of molten material so as to avoid contamination of the product upon replacement of the screen elements.

The invention contemplates a screen-change device of simple and dependable construction. The changer housing is effectively protected against uncontrollable accumulations of product in the housing as well as emergence of the product by a flange which is applied in each case on the outlet side. Thus, it is accessible at all times, so that contamination of the product by the penetration of cracked components of the molten material into the filter chambers is prevented. The otherwise necessary sealing elements formed of clamping rings to which traces of product adhere and which are difficulty accessible from the outside are eliminated. The arrangement of the flange in a manner which is thermally separated from the changer housing makes possible the desired cooling thereof and thus a controlled reduction of the sealing gap between its receiving borehole and the changer housing.

This sealing gap is so dimensioned with a gap width of 0.1 mm at room temperature that, in operation, reduction thereof to about 0.03 mm is obtained. The narrowing of the gap is produced in this connection by shrinkage effected by the cooling of the flange.

The molten mass which solidifies in the remaining part of the gap due to the cooling acts as a narrow and thin film around the change slide to provide a complete seal. In this connection suitable guidance of the change slide in the changer housing is assured by a sufficiently constant sliding clearance so that wear of the changer slide is reduced to a minimum.

The cooling of the flange is produced in an advantageous manner by a coolant channel which extends around the receiving borehole of the flange.

By a further development of the screen-change device in accordance with the features of the invention, a precise, gapless fit of the receiving borehole of the flange to the change slide as well as snug guidance thereof in the changer housing are obtained. In this connection the volume of the screen chamber is limited to the lengthwise dimension of the screen elements.

BRIEF DESCRIPTION OF THE DRAWING

The invention will be described in further detail when read with the accompanying drawing which shows a presently preferred embodiment of the invention. In the drawing:

FIG. 3 shows another development of the screen-change device of the invention with two active melt filter chambers; and FIG. 4 shows the screen-change device of FIG. 3, showing the process of changing the screen elements.

DETAILED DESCRIPTION OF THE PREFERRED EMBODIMENT

Figure 1:
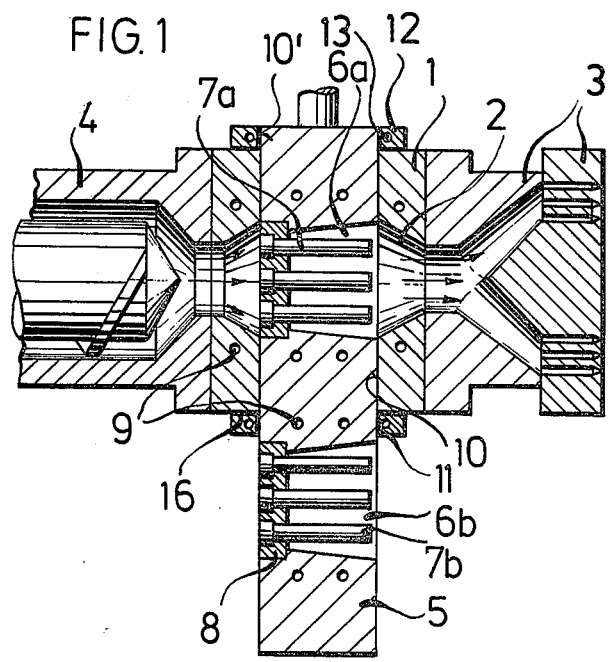
FIG. 1 is a longitudinal section through a screen-change device in accordance with the invention.

The screen-change device shown in FIG. 1 includes a changer housing 1 whose feed channel 2 for the conducting of the molten plastic to a granulator housing 3 is directly connected to an extruder 4. A change slide 5 which is guided within a receiving borehole 10 in the changer housing 1 transverse to the feed channel 2 by means of a hydraulic cylinder, not shown in detail, has boreholes 6a and 6b which serve to receive hollow cylindrical screen elements 7a, 7b. These screen elements are inserted into the corresponding borehole 6a, 6b respectively by means of a holder plate 8.

In the change slide 5 shown in FIG. 1, one group of the screen elements 7a is initially in operating position within the passage channel 2 while the other group of screen elements 7b stands ready for the replacement process. The change housing 1 as well as the change slide 5 have heating channels 9 which serve for the flow of a heating fluid in order to compensate for heat losses of the molten plastic.

The guiding of the change slide 5 is effected within the changer housing 1 with clearance sufficient for the sliding movement of the change slide, while the sealing against the emergence of molten material is obtained by means of a variable sealing gap 11 formed between flange 12 and the slide surface of the change slide 5.

Cooling channels 13 provided within the flange 12 and traversed by a cooling fluid permit the cooling of the flange so that a desired reduction in the sealing gap 11 is made possible. In this connection, at the same time the film of molten material which fills the sealing gap 11 is solidified.

An insulating layer 16 present between the changer housing 1 and the flange 12 permits thermal insulation of these structural parts.

Figure 2:
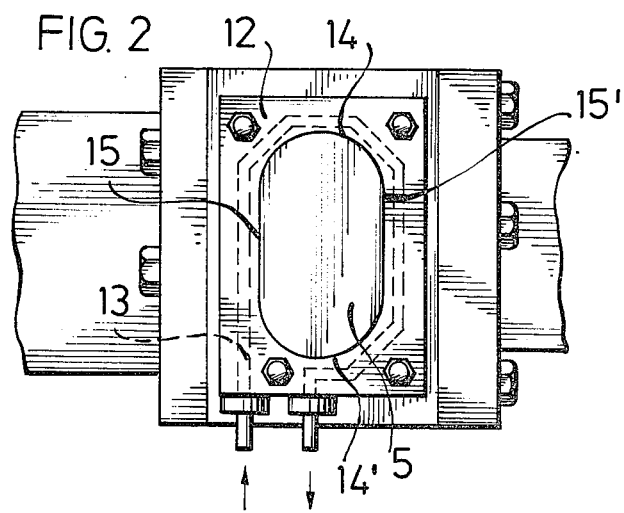
FIG. 2 is a side view of the screen-change device of FIG. 1.

As shown in FIG. 2, the reception borehole of the flange 12 and thus the cross-section of the change slide 5 is formed in an oval shape which is composed of circular rings 14,14′ forming two half-cylinders and of a rectangle having the side surfaces 15,15′.

The reception borehole 10′ of the flange 12 can therefore be fitted, free of gaps, to the cross-sectional shape of the change slide 5. Furthermore with the cross-sectional shape the development of a filter chamber volume which is adapted in the change slide 5 to the length of the hollow cylindrical screen element 7a,7b is obtained with the smallest possible circumference of the sealing surface.

FIG. 3 shows a change slide 5 having two boreholes 6a,6b which are arranged along the feed channel 2, each of the boreholes being adapted to receive a group of screen elements 7a and 7b respectively. In the operating position of the change slide 5 shown in this figure, both of the groups of screen elements are in use.

At a given loss of pressure of the molten material in the feed channel 2, caused by dirtying of the screen elements 7a, 7b, the change slide 5 is pushed transversely to the stream of molten material into the position shown in FIG. 4 by the hydraulic cylinder, not shown in detail.

After the screen elements 7a have been replaced in this manner, the change slide 5 is brought back into its normal operating position, shown in FIG. 3.

To replace the screen element 7b the slide is driven downward to the point the element is accessible below the feed passage 2.

The simultnaeous provision of two groups of screen elements 7a,7b in the feed passage channel 2 has the advantage that, despite use of only one change slide, an exchange and the placing in operation of the newly introduced group of screen elements takes place within a short time.

Furthermore, the screen-change device is characterized by a simple construction.

The arrangement for the prevention of the emergence of molten material through the reception borehole 10 of the change slide 5 is arranged outside on the changer housing in a readily accessible manner. It has no dead spaces but merely smooth guide surfaces, this result being obtained, in particular, also by the oval-shaped cross section of the reception borehole 10′ of the flange 12 and of the change slide 5.

While only one embodiment of the invention has been shown and described in detail, there will now be obvious to those skilled in the art many modifications and variations satisfying many or all of the objects of the invention without departing from the spirit thereof as defined by the appended claims.

What is claimed is:

1. Screening apparatus for molten plastic flowing from an extruder of plastic material, said screening apparatus comprising a housing adapted for being mounted on the extruder and having a feed channel for flow of plastic material from the extruder through said housing, a slide member, said housing having a borehole in which said slide member is slidably mounted with clearance, replaceable screen elements on said slide member for being discontinuously positioned in the path of the plastic material flowing from said extruder, and means for sealing the clearance between the slide member and said housing to prevent outflow of plastic material therefrom, said means comprising a flange on said housing surrounding said borehole and facing said slide member with a minimal gap therebetween to permit normal free sliding movement of said slide member, a cooling channel in said flange for flow of a coolant for cooling said flange to minimize said gap and to cool plastic material in said gap for solidifying said plastic material to prevent outflow of plastic material from said gap, and thermal insulation means between said flange and said housing for preventing cooling of said housing by the cooling of said flange.

2. Screening apparatus as claimed in claim 1 wherein said slide member has an outer surface and said flange has an inner surface surrounding the outer surface of the slide member, said outer surface of the slide member and the inner surface of the flange having the same cross-sectional shape, said shape being non-circular.

3. Screening apparatus as claimed in claim 1, wherein said non-circular cross-section of said slide member and said flange includes two spaced, facing semi-circles connected by a pair of parallel lines.

4. Screening apparatus as claimed in claim 1 comprising a second of said flanges, said housing having opposite ends through which said slide member can travel, said flanges being located at respective opposite ends of said housing.

5. Screening apparatus as claimed in claim 1 wherein said gap is less than 0.1 mm at room temperature.

6. Screening apparatus as claimed in claim 2 wherein said cross-sectional shape is oval.

7. Screening apparatus as claimed in claim 1 wherein said flange is mounted on said housing such that said gap formed with said slide member is continuous with the clearance formed between the housing and the slide member.

8. Screening apparatus as claimed in claim 1 wherein said slide member has a through passage for plastic material in which said screen elements are disposed to convey plastic material from said feed channel of said housing.

9. Screening apparatus as claimed in claim 2 wherein said through passage includes two transversely spaced bores extending parallel to the direction of flow of plastic material in said feed channel, said slide member being slidable transversely between three positions including a first position in which both bores are in communication with said feed channel, a second position in which one of said bores is in communication with said feed channel and the other external thereto, and a third position in which said other bore is in communication with said feed channel and said one bore is external thereto.

* * * * *